Patented Aug. 31, 1926.

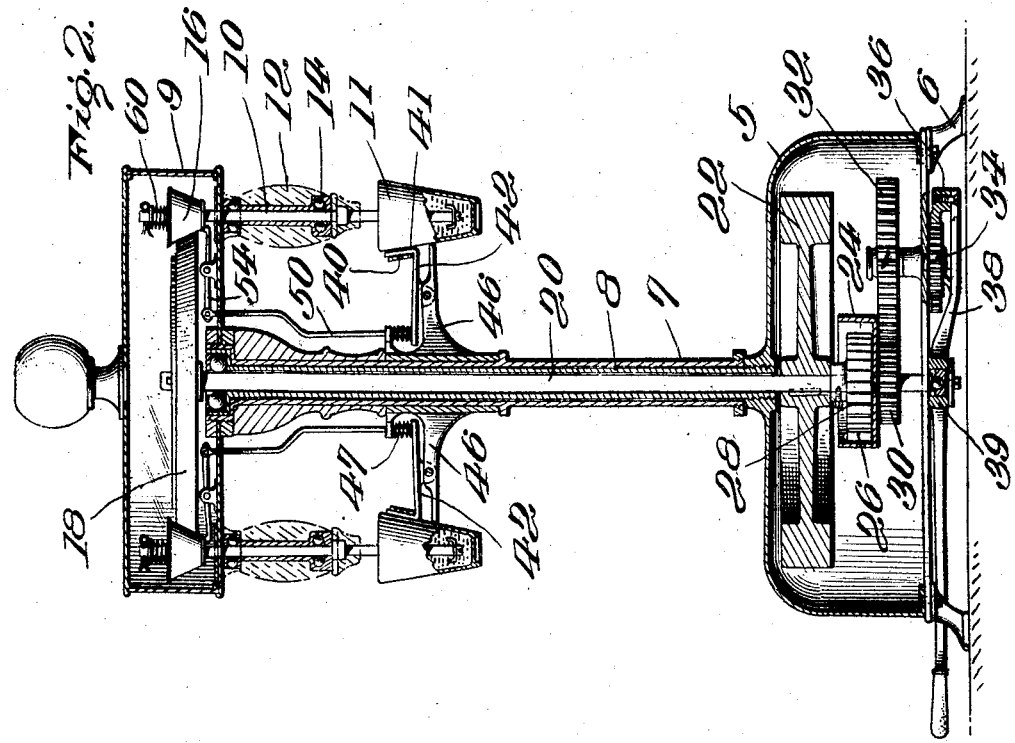

1,597,712

UNITED STATES PATENT OFFICE.

TOMÁS LUIS BÉJAR, OF HABANA, CUBA.

MIXING DEVICE FOR LIQUID REFRESHMENTS.

Application filed February 8, 1926. Serial No. 86,918.

This invention relates to mixing devices especially adapted for mixing various liquid refreshments.

Briefly stated, an important object of the invention is to provide simple and reliable means whereby one or more drinks may be expeditiously mixed by the operation of a single lever which will obviate the need of employing an electric motor as is now so generally done.

Another object of the invention is to provide a mixer for liquid refreshments which is attractive, durable, and comparatively cheap to manufacture.

Other objects and advantages will be apparent during the course of the following description:

In the accompanying drawing forming a part of this application and in which like numerals are employed to designate like parts throughout the same, Figure 1 is a perspective of the improved mixer.

Figure 2 is a vertical sectional view through the same.

In the drawing, wherein for the purpose of illustration is shown a preferred embodiment of the invention, the numeral 5 designates a hollow base mounted upon legs 6 and supporting inner and outer tubular standards 7 and 8, respectively. The upper tubular standard may have an ornamental exterior, and as shown in Figure 2, supports a housing 9 of substantially disc shaped formation.

In carrying out the invention a plurality of spindles 10 extend downwardly from the housing 9 and are provided at their lower portions with suitable agitators adapted to be received in cups 11, the cups being adapted for the reception of the ingredients of a liquid refreshment. Suitable bearing casings 12 extend downwardly from the housing 9 and are provided with anti-friction elements 14 by means of which the friction incident to the turning of the spindles 10 is reduced to a minimum.

The upper portions of the spindles 10 have keyed and slidable connection with tapered friction wheels 16 adapted for driving contact with the beveled edge of a main driving disc 18. The driving disc 18 is keyed or otherwise rigidly connected to the upper portion of a main driving shaft 20 extended through the housing 8 and having its lower portion provided with a balance wheel 22.

The balance wheel 22 is, of course, located within the hollow base 5 and when the shaft is rapidly turned by means to be described, the balance wheel 22 serves to continue the motion of the shaft as will be understood.

Figure 2 illustrates that a cup shaped driving member 24 is mounted on the lower portion of the shaft 20 and is provided with a pawl 26 adapted for driving engagement with the teeth of a ratchet wheel 28. The ratchet wheel is keyed or otherwise rigidly connected to the shaft 20.

It is important to note that a driven gear 30 has rigid connection with the driving cup 24 and is in constant engagement with a main driving gear 32 mounted upon a stub shaft extended through the bottom of the base 5 and carrying a small spur gear 34. Figure 2 illustrates that the spur gear 34 is in mesh with the teeth of an arcuate rack or gear segment 36 on the forward portion of a manually operated lever 38. The lever is fulcrumed as indicated at 39 and is provided with a handle at the rear end thereof whereby the operator may rock the lever and bring about the turning of the gear 30, the cup shaped driving member 24, the shaft 20 and associated elements at a very high speed. As previously stated, when the parts are thus set in motion the balance wheel 24 serves to continue the rotation of the motion transmitting mechanism until the same has spent itself.

With reference to the foregoing description it will be apparent that the manual operation of the lever 34 will bring about the turning of the agitators or spindles 10 for the mixing of the liquid refreshments in the cups 10. It will be observed that each cup 11 is provided with an attaching member or strap 40 having what might be said to be a socket or opening for the reception of the upstanding end 41 of a lever 42 which lever 42 is fulcrumed intermediate the ends thereof to a bracket 46 carried by the tubular standard 7. Therefore when a cup 11 is attached to the outer portion of one of the levers 42, as shown in Figure 1, the inner portion of that lever is moved upwardly to overcome the tension of a coil spring 47. When the lever 42 is thus operated by the weight of the cup 11 and the contents of the same, a link 50 engaged with the inner end of the lever is moved upwardly to rock a lever 54, the outer portion of which is engaged with one of the driven wheels 16.

Figure 2 illustrates that each spindle 10 is provided with a coil spring 60 which exerts tension on the driven wheel 16 to hold the same in frictional contact with the driving disc 18. However, the strength of the spring 47 is great enough to normally overcome the strength of the spring 60 and consequently the wheel 16 is normally out of driving engagement with the disc 18. Therefore, the application of the cup 11 to the lever 42 will result in the movement of the outer portion of the lever 54 downwardly so that the spring 60 may come into play and thereby establish a driving engagement between the disc 18 and the agitator. The result of this is that the agitators do not turn until the cups have been properly applied. This is an important feature of the invention since the agitators are not turning during the application of the cup. This would be inconvenient for the reason that the refreshment to be mixed would probably be spilled out of the container by the agitators. Of course, preparatory to the application of one or more of the cups, the shaft 20 is set in motion by the lever 38 and is continued in motion by the balance wheel 22.

Having thus described the invention what is claimed is:

1. A refreshment mixing device comprising a base, a standard mounted thereon, a housing mounted on the standard, a drive shaft extending through the standard, a driving disc mounted on the shaft within said housing, a driven wheel adapted for frictional contact with the driving disc and having a depending spindle, spring means normally urging the driven wheel into engagement with the driving disc, a lever associated with said driven wheel, a link connected to said lever, a second lever having connection with said link, a liquid container adapted to be hung on said second named lever to swing the same on its fulcrum, and a spring engaged with one end of said second named lever and adapted to overcome the strength of said first named spring.

2. A refreshment mixing apparatus comprising a standard, a housing mounted on the standard, a driving disc within said housing, a drive shaft extending through said standard and connected to said disc, a driven wheel adapted for operative engagement with said disc, a spindle having a keyed slidable connection with said driven disc, a spring mounted on said spindle and normally urging said driven wheel into engagement with said disc, an arm carried by said standard, a lever fulcrumed to said arm and having an upwardly directed terminal portion, a cup having means whereby the same may be attached to the upwardly directed terminal portion of said lever and adapted to rock the lever, a link engaged with one end of said lever, a second lever adapted to engage said driven wheel and having connection with said link, and a spring engaged with said first named lever and adapted to hold the first named lever in an inoperative position whereby the first named spring is allowed to function.

3. A refreshment mixing apparatus comprising a base, a tubular standard mounted on the base, a shaft extending through the standard, motion-transmitting mechanism operated by said shaft, agitators having connections with said motion transmitting mechanism, cups adapted to partially receive said agitator, spring means for normally maintaining the agitators in an inoperative relation with the motion-transmitting mechanism, cup-supporting means adapted to be maintained in a predetermined position by the spring means, said cup supporting means, when the cups are placed in operative position, being adapted to be actuated against the action of the spring means so that the agitators are moved in operative relation with the motion transmitting mechanism.

4. A refreshment mixing apparatus comprising a support including a standard, means adapted to be rotated and mounted at the upper end of the standard, agitators mounted for rotation at opposite sides of the standards, and means adapted to be engaged with the rotatable means for causing rotation of the agitators, a cup-supporting means carried by the standards adapted to be oscillated when cups are placed thereon, spring means resisting oscillation of the supporting means, means between the cup-supporting means and the rotatable means connected with the agitators actuated by the spring means for causing the second mentioned rotatable means to be moved out of engagement with the first mentioned rotatable means but adapted, when the cup-supporting means is actuated by the position of the cups, to cause the second mentioned rotatable means to be placed in operative engagement with the first mentioned rotatable means whereby the agitators are revolved, and means for causing rotation of the first mentioned rotatable means.

In testimony whereof I affix my signature.

TOMÁS LUIS BÉJAR.